United States Patent Office 2,974,181
Patented Mar. 7, 1961

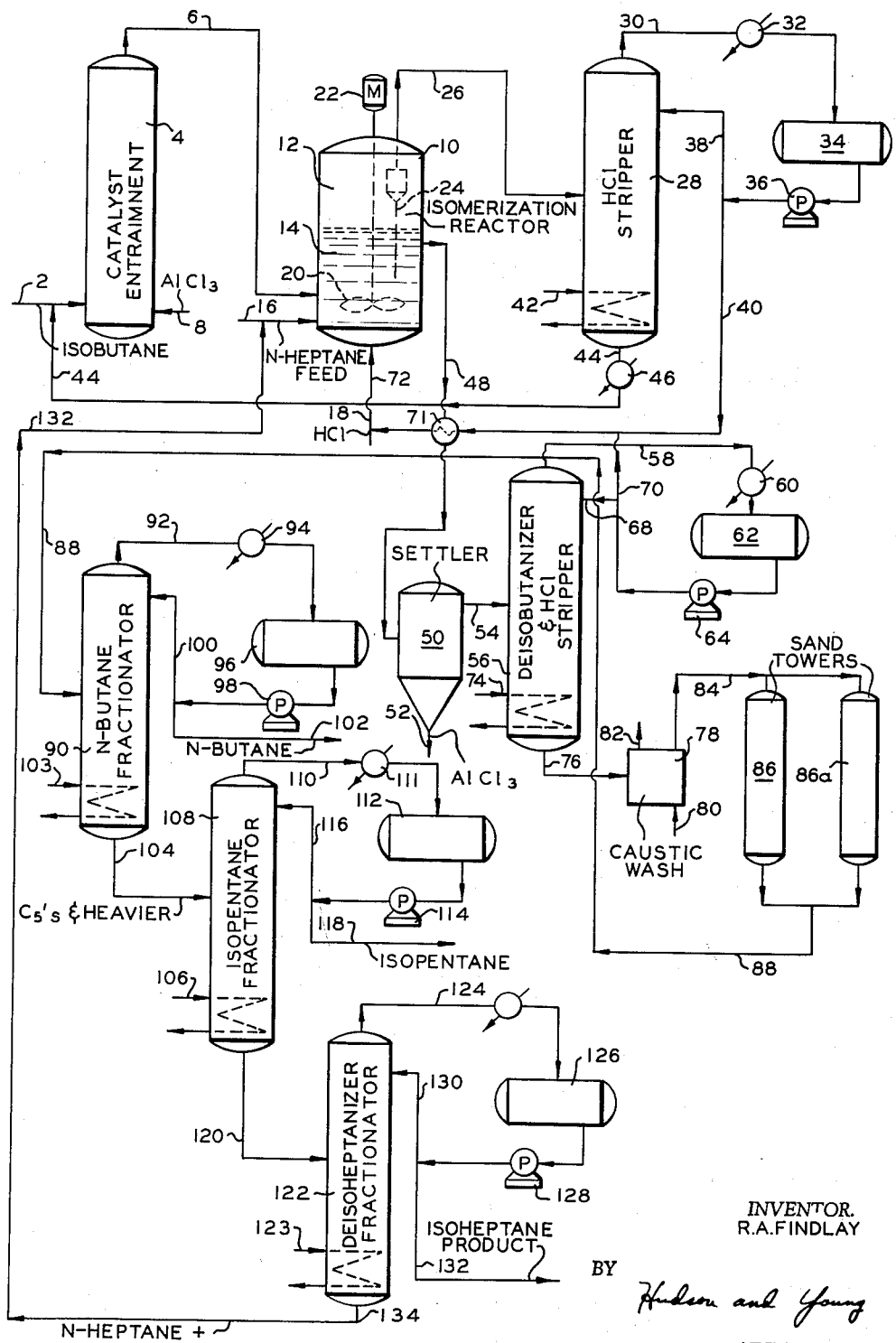

2,974,181

HYDROCARBON ISOMERIZATION USING A VAPORIZED CATALYST

Robert A. Findlay, Bartlesville, Okla., assignor to Phillips Petroleum Company, a corporation of Delaware Filed Aug. 18, 1958, Ser. No. 755,455

3 Claims. (Cl. 260—683.7)

This invention relates to improved catalyst for use in hydrocarbon conversion process. In one aspect it relates to an improved method for introducing aluminum chloride catalyst to a hydrocarbon reaction. In another aspect it relates to a method for providing more active aluminum chloride catalyst for use in the conversion of hydrocarbons.

Aluminum chloride finds use in a number of hydrocarbon reactions, which include isomerization, alkylation, polymerization, hydrogen-transfer reactions and other reactions employing Friedel-Crafts catalysts. Often the catalyst is employed in the form of a powder which can be suspended in hydrocarbons to form a dispersion or slurry. The activity of the catalyst is dependent in part on the surface area which is exposed to the hydrocarbon reactants; thus it is desirable to provide catalyst particles having large surface areas. Increasing the surface area and activity of the catalyst provides increased reaction rates or enables operation at lower temperatures with the same reaction rates.

It is an object of this invention to provide an improved catalyst for use in hydrocarbon conversion processes.

Another object of the invention is to provide an improved process for the conversion of hydrocarbons.

Still another object of the invention is to provide an improved process for the conversion of hydrocarbons in the presence of aluminum chloride catalyst.

Yet another object of the invention is to provide an improved process for introducing aluminum chloride catalyst in contact with hydrocarbon reactants.

Still another object of the invention is to provide an improved process for the isomerization of hydrocarbons in the presence of aluminum chloride catalyst.

The foregoing objects are achieved broadly by dissolving aluminum chloride in a solvent and reducing the pressure on said solvent whereby solvent is vaporized and catalyst is released from solution as a finely subdivided powder having a high surface area and increased activity.

In one aspect of the invention the catalyst solution is introduced to a reaction zone containing hydrocarbon reactants before the vaporization step. The reactor and reactants are cooled by vaporization of the solvent and conversion of the hydrocarbons is obtained at low temperatures, by virtue of the increased activity of the catalyst particles.

In carrying out the invention in one embodiment thereof, aluminum chloride is dissolved in a solvent, such as isobutane, and introduced to a zone of lower pressure wherein a portion of the isobutane is vaporized and the catalyst is released from solution in the form of finely subdivided powder of high surface area. Release or precipitation of the catalyst from solution is effected by reducing the quantity of liquid solvent and by the decrease in temperature which occurs during vaporization of the solvent, both of which reduce the amount of catalyst which can be retained in solution. Vaporization of solvent from the solution can be carried out stagewise, as in a conventional autorefrigeration process; however, preferably the solvent is vaporized by introducing the solution to a zone of substantially constant reduced pressure. When operating in accordance with the latter procedure solvent vaporization and release of the catalyst from solution occur almost instantaneously. It is within the scope of the invention to vaporize or flash all of the solvent thus leaving a finely subdivided dry powder catalyst or only a portion of the solvent can be vaporized whereby the released catalyst is obtained in the form of a dispersion or slurry. After the catalyst is in the desired particle form it can be contacted with the hydrocarbon or hydrocarbons to be converted in any suitable manner. In one method of operation the catalyst is released or precipitated from solution in one zone and then transferred to a second zone wherein it is contacted with the hydrocarbon reactants. In another, more preferred method a single zone is used for carrying out both operations. In accordance with the latter method the catalyst solution is introduced to a reaction zone maintained at a reduced pressure, preferably below the liquid level of the reactants. The catalyst, which is released from solution, is immediately brought into intimate contact with the reactants whereby conversion of the reactants readily takes place.

The solvents which are employed in the process are in general low boiling materials which can be flashed or vaporized at ordinary temperatures and pressures. The preferred solvents are low boiling hydrocarbons and more particularly, low boiling alkanes containing 2 to 5 carbon atoms, such as propane, butane, pentane, etc., and more particularly isoparaffins, such as isobutane and isopentane. The preferred solvents are those which dissolve the catalyst at higher temperatures but in which the catalyst is relatively insoluble at reduced temperatures. It is also desirable to use solvents which are readily separated from the hydrocarbon reactants and reaction products. The temperatures and pressures employed in the precipitation or release of the catalyst will vary depending on the particular solvent employed and also on the hydrocarbon conversion reaction which is carried out. For example, aluminum chloride can be dissolved in isobutane at temperatures in the range of 100 to 300° F. and precipitated by vaporizing isobutane and reducing the temperature to between about 0 and about 100° F. In general, it is preferred that the temperatures and the pressures be maintained at or above atmospheric.

As previously stated, aluminum chloride can be used as a catalyst in a wide variety of hydrocarbon reactions. The following discussion is primarily directed to the conversion of hydrocarbons by isomerization. This, however, is not intended in any limiting sense and it is within the scope of the invention to employ the finely subdivided catalyst broadly in the conversion of hydrocarbons.

In the conventional isomerization reaction straight chain paraffins such as butane, pentane, hexane, and higher molecular weight compounds are converted to isomers. Also, moderately branched paraffins can be converted to more highly branched isomers, for example, 2-methylpentane can be converted to 2,2-dimethylbutane. It is also possible to catalyze the conversion of naphthenic hydrocarbons having 5, 6, 7 and more carbon atoms in the rings. For example, methylcyclopentane can be converted to cyclohexane, 1,1-dimethylcyclobutane to methylcyclopentane, 1,2-dimethylcyclopentanes to methylcyclohexanes, etc. The isomerization reaction is usually carried out at temperatures between about 25° C. and about 400° C. at pressures from 1 atmosphere to 1000 p.s.i or higher and at liquid hourly space velocities from between about 0.1 to about 20.

In order to more clearly describe the invention and provide a better understanding thereof reference is had to the accompanying drawing which is a diagrammatic illustration of a unit suitable for the isomerization of hydrocarbons. Referring to the drawing, fresh, preferably dry isobutane through conduit 2 and recycle isobutane through conduit 44 are introduced to catalyst entrainment vessel 4. In this vessel the isobutane is intimately mixed with aluminum chloride provided through conduit 8, under conditions such that the catalyst is dissolved in the isobutane. The solution is then passed from entrainment vessel 4 through conduit 6 and introduced to reactor 10. Reactor 10 contains a liquid reaction mixture 14 superposed by a vapor space 12. The liquid mixture comprises normal heptane which is made up of fresh feed introduced through conduit 16 and recycle heptane which is provided through conduit 132. In addition the mixture contains hydrogen chloride which is introduced through conduits 18 and 70 and recycle isobutane which is returned to the reactor from stripper 56, also through conduit 70. The solution of aluminum chloride in isobutane is added to the reactor liquid phase, preferably in a dispersed form, for example, through through spray nozzles, so as to provide speedy dispersion of the catalyst throughout the liquid mixture. The reactor is maintained at a temperature of about 80° F. and at a pressure of about 40 p.s.i.a., which is substantially below the pressure of the entering catalyst solution. Upon entering the reactor a portion of the isobutane is vaporized, whereby the reaction mixture and remaining isobutane solution are cooled and catalyst is released from the solution in the form of finely subdivided particles. The catalyst is quickly dispersed throughout the liquid mixture, which is agitated by a mixer 20 driven by motor 22, and conversion of the normal heptane feed to isomers is effected.

The effluent from the reactor comprises two streams, a gaseous stream which is taken overhead through conduit 26 and liquid effluent which is withdrawn through conduit 48. The gaseous stream before leaving the reactor passes through a cyclone 24 which separates entrained catalyst and returns the catalyst to the liquid reaction mixture. The gases, which comprise principally hydrogen chloride and isobutane, are passed into hydrogen chloride stripper 28 which is heated by reboiler 42. In this stripper, which can be a conventional tray tower, hydrogen chloride is separated, passing overhead through conduit 30, condenser 32 and into an accumulator 34. The accumulated material is removed through pump 36, with a portion being recycled to the stripper through conduit 38 and the remainder passing through conduits 40 and 72 into the liquid phase of the isomerization reactor. The bottoms from the stripper, essentially isobutane, are removed through conduit 44 and cooler 46 and are added to the fresh isobutane entering the catalyst entrainment vessel, as previously set forth.

Liquid effluent from the isomerization reactor is removed through conduit 48, passed in heat exchange with recycle hydrogen chloride through exchanger 71 and then introduced to settling zone 50 wherein aluminum chloride catalyst is settled, and removed through conduit 52. The recovered catalyst can be recycled to the isomerization reactor or removed from the unit. The hydrocarbon portion of the effluent is removed from the settling zone and introduced through conduit 54 to deisobutanizer and hydrogen chloride stripper 56. In this tower which is heated by reboiler 74 separation of the heavier hydrocarbons is effected. The isobutane and hydrogen chloride pass overhead from the stripper in the gaseous state through conduit 58, are condensed in condenser 60 and enter accumulator 62. A portion of the accumulated liquid is returned to the stripper through pump 64 and conduit 68 and the remainder is returned to the isomerization reaction through conduit 70 and 72. The bottoms from the stripper pass through conduit 76 and into a caustic wash vessel 78 wherein this material is washed to remove any residual catalyst or hydrogen chloride. Caustic for this purpose is introduced to the wash vessel through conduit 80 and removed through conduit 82. The hydrocarbon stream is removed from the caustic wash through conduit 84, passed through sand towers 86 and 86a to remove caustic, and then is introduced through conduit 88 to normal butane fractionator 90. In this tower, which can also be a conventional tray tower, heat is provided through reboiler 103 whereby normal butane is vaporized and separated from the heavier hydrocarbons. The lower boiling hydrocarbon passes overhead through conduit 92 and condenser 94 into accumulator 96. The accumulated liquid is divided with a portion being returned to the fractionator through pump 98 and conduit 100 and the remainder being yielded from the unit through conduit 102. The fractionator bottoms, now comprising pentanes and heavier hydrocarbons, are passed through conduit 104 to isopentane fractionator 108. In this tower isopentane is separated, being passed overhead through conduit 110 and condenser 111. The condensed overhead is accumulated in vessel 112 from which it is withdrawn through pump 114 and divided, with a portion being returned to the fractionator as reflux through conduit 116 and the remainder being yielded from the unit as product through conduit 118. The bottoms from fractionator 108 are introduced through conduit 120 to deisoheptanizer 122. In this fractionator, which is heated by reboiler 123, isoheptane and lighter hydrocarbons are separated from normal heptane and heavier hydrocarbons. The heptanes and heavier are yielded from the bottom of the fractionator through conduit 134 and the isoheptane and lighter are taken overhead through conduit 124, condensed and introduced to accumulator 126. The accumulated material is returned in part through pump 128 and conduit 130 to the fractionator and the remainder of the isoheptane is yielded as product. The bottoms from the fractionator are recycled to the isomerization reactor through conduit 132, as previously set forth.

While the preceding has been directed to a specific application of the invention it is to be clearly understood that it is within the scope of the invention to utilize other conventional process flows and apparatus for carrying out the invention. It is also within the scope of the invention to utilize the aluminum chloride catalyst in carrying out other hydrocarbon reactions, such as polymerization, alkylation, etc., as previously set forth.

The following data are presented in illustration of an embodiment of the invention.

*Example*

| Flows | | lb./hr. |
|---|---|---|
| Isobutane to catalyst entrainment vessel (2+44) | | 1430 |
| AlCl$_3$ to catalyst entrainment vessel (8) | | 3.6 |
| n-Heptane feed to reactor (16+132) | | 3400 |
| HCl+isobutane to reactor (72) | | 6305 |
| Composition: | | |
| HCl | wt. percent | 1.7 |
| Isobutane | wt. percent | 98.3 |
| Feed to HCl stripper (26) | | 1550 |
| Composition: | | |
| Butanes | wt. percent | 93.1 |
| HCl | wt. percent | 6.9 |
| Pentanes(+) | wt. percent | traces |
| Reactor effluent (48) | | 9585 |
| Composition: | | |
| Butanes | wt. percent | 65.5 |
| HCl | wt. percent | trace |
| C$_5$(+) | wt. percent | 34.5 |
| Catalyst | | 3.6 |
| Feed to fractionator (90) | | 3400 |
| Composition: | | |
| Butanes | wt. percent | 3.0 |
| n-Pentane | wt. percent | 3.8 |
| i-Pentane | wt. percent | 18.8 |
| C$_6$(+) | wt. percent | 74.4 |
| Feed to fractionator (108) | | 3300 |
| Composition: | | |
| n-Pentane | wt. percent | 4.0 |
| i-Pentane | wt. percent | 19.5 |
| C$_6$(+) | wt. percent | 76.5 |
| Feed to fractionator (122) | | 2650 |
| Composition: | | |
| iC$_7$ and lighter | wt. percent | 92.2 |
| nC$_7$(+) | wt. percent | 7.8 |

*Example—Continued*

Temperatures: °F.
- Catalyst entrainment vessel (4) — 140
- Reactor (10) — 80
- Deisobutanizer and HCl stripper-top (56) — 110
- Sand towers (86 and 86A) — 95
- Fractionator-top (90) — 110
- Fractionator-top (108) — 100
- Fractionator-top (122) — 125

Pressures: p.s.i.a.
- Catalyst entrainment (4) — 150
- Reactor (10) — 40
- Deisobutanizer and HCl stripper (56) — 100
- Sand towers (86 and 86A) — 85
- Fractionator (90) — 70
- Fractionator (108) — 20
- Fractionator (122) — atm.

Having thus described the invention by providing a specific example thereof, it is to be understood that no undue limitations or restrictions are to be drawn by reason thereof and that many variations and modifications are within the scope of the invention.

I claim:

1. A process for the isomerization of heptane which comprises dissolving aluminum chloride in isobutane at a temperature between about 100 and about 300° F., introducing the solution to a reaction zone of substantially constant reduced pressure containing normal heptane, below the liquid level of said normal heptane, whereby isobutane is vaporized, the reaction zone temperature is decreased to between 0 and about 100° F., catalyst is released as a finely subdivided powder and dispersed through the normal heptane and maintaining the reaction zone under conditions whereby said normal heptane is isomerized.

2. A process for the isomerization of an isomerizable hydrocarbon selected from the group consisting of paraffins and cycloparaffins which comprises dissolving aluminum chloride in isobutane at a temperature between about 100 and 300° F., introducing the solution to a reaction zone of substantially constant reduced pressure containing said isomerizable hydrocarbon, below the liquid level of said isomerizable hydrocarbon, whereby isobutane is vaporized, the reaction zone temperature is decreased to between 0 and about 100° F., catalyst is released as a finely subdivided powder and dispersed through the isomerizable hydrocarbon and maintaining the reaction zone under conditions whereby isomerizable hydrocarbon is isomerized.

3. A process for the isomerization of an isomerizable hydrocarbon selected from the group consisting of paraffins and cycloparaffins which comprises dissolving aluminum chloride in an alkane containing from 2 to 5 carbon atoms, introducing the solution to a reaction zone of substantially constant reduced pressure containing said isomerizable hydrocarbon, below the liquid level of said isomerizable hydrocarbon, whereby alkane is vaporized to cool the reaction zone and catalyst is released as a finely subdivided powder and dispersed through the isomerizable hydrocarbon, and maintaining the reaction zone under conditions whereby isomerizable hydrocarbon is isomerized.

References Cited in the file of this patent

UNITED STATES PATENTS

| | | |
|---|---|---|
| 1,202,081 | McAfee | Oct. 24, 1916 |
| 2,356,487 | Upham | Aug. 22, 1944 |
| 2,411,817 | Thompson et al. | Nov. 26, 1946 |
| 2,439,737 | Houston et al. | Apr. 13, 1948 |